US008006028B2

(12) United States Patent
Dang et al.

(10) Patent No.: US 8,006,028 B2
(45) Date of Patent: Aug. 23, 2011

(54) ENABLING MEMORY MODULE SLOTS IN A COMPUTING SYSTEM AFTER A REPAIR ACTION

(75) Inventors: Tu T. Dang, Cary, NC (US); Robert F. Kantner, Jr., Chapel Hill, NC (US); Henry G. McMillan, Raleigh, NC (US); Carl A. Morrell, Cary, NC (US); Challis L. Purrington, Raleigh, NC (US); Mark W. Williams, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 11/960,544

(22) Filed: Apr. 8, 2008

(65) Prior Publication Data

US 2009/0254732 A1 Oct. 8, 2009

(51) Int. Cl.
*G06F 12/00* (2006.01)

(52) U.S. Cl. ............... 711/5; 711/172; 711/E12.001; 713/1

(58) Field of Classification Search .................. None
See application file for complete search history.

(56) References Cited

U.S. PATENT DOCUMENTS

| | | | |
|---|---|---|---|
| 5,012,408 A * | 4/1991 | Conroy | 711/172 |
| 6,684,292 B2 | 1/2004 | Piccirillo et al. | |
| 6,766,469 B2 | 7/2004 | Larson et al. | |
| 6,854,070 B2 | 2/2005 | Johnson et al. | |
| 7,028,213 B2 | 4/2006 | Majni et al. | |
| 7,200,770 B2 * | 4/2007 | Hartwell et al. | 714/7 |
| 7,370,238 B2 * | 5/2008 | Billick et al. | 714/36 |
| 2002/0129186 A1 * | 9/2002 | Emerson et al. | 710/302 |
| 2004/0064686 A1 * | 4/2004 | Miller et al. | 713/1 |
| 2005/0102568 A1 * | 5/2005 | Billick et al. | 714/25 |
| 2008/0140736 A1 * | 6/2008 | Jarno | 707/204 |
| 2009/0089531 A1 * | 4/2009 | Johnson et al. | 711/170 |

* cited by examiner

*Primary Examiner* — Kevin Verbrugge
(74) *Attorney, Agent, or Firm* — Edward J. Lenart; Cynthia G. Seal; Biggers & Ohanian, LLP

(57) ABSTRACT

Methods, systems, and products are disclosed for enabling memory module slots in a computing system after a repair action, the computing system having a plurality of memory module slots and having at least one memory module installed in one of the memory module slots, that includes: determining, during a boot process for the computing system, whether any of the memory module slots are disabled; and if any of the memory module slots are disabled: retrieving, for each memory module installed in one of the memory module slots, a memory module identifier for that memory module, retrieving, from non-volatile memory of the computing system, previously stored memory module identifiers, determining whether the retrieved memory module identifiers match the previously stored memory module identifiers, and enabling the disabled memory module slots if the retrieved memory module identifiers do not match the previously stored memory module identifiers.

19 Claims, 3 Drawing Sheets

ENABLING MEMORY MODULE SLOTS IN A COMPUTING SYSTEM AFTER A REPAIR ACTION

BACKGROUND OF THE INVENTION

1. Field of the Invention

The field of the invention is enabling memory module slots in a computing system after a repair action.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. Advances in semiconductor processing and computer architecture have served to push the performance of the computer higher and higher and have resulted in computer systems today that are much more powerful than just a few years ago.

Throughout the advancement of semiconductor processing and computer architecture, advancements in computer memory subsystems have played an important role in creating more powerful computers. To maintain the steady overall increase in computer performance, increases in the speed and reliability of computer memory subsystems have complimented increases in the speed and reliability of computer processors. In fact, the speed of these computer memory subsystems has increased by several orders of magnitude in recent years.

Computer memory subsystems are typically composed of a memory controller that provides access to one or more memory modules installed in memory module slots. Memory modules may be implemented as Dual In-Line Memory Modules ('DIMM') or Single In-Line Memory Modules ('SIMM'). Currently, the Joint Electron Device Engineering Council ('JEDEC') serves as an important source of design standards for these computer memory subsystems. JEDEC was founded in 1960 and is the semiconductor engineering standardization body of the Electronic Industries Alliance ('EIA'). EIA is a trade association that represents all areas of the electronics industry and works to promulgate standards throughout the electronics industry that meet the needs of both manufacturers and consumers.

Often during the operation of a computer memory subsystem, one or more of the memory modules may fail. Upon detecting a failed memory module, the system Basic Input/Output System ('BIOS') typically disables the memory module slot in which the failed memory module is installed by mapping that memory module slot out of the processor's address space. At some later point in time, a computer technician may perform a repair action by replacing the memory module in the computer memory subsystem. To utilize the new memory module, the disabled memory module slot must be enabled. To enable the disabled memory module slot, the technician or another user must typically use the BIOS configuration user interface to traverse through various BIOS setup menus until locating the memory slot enablement menu. Because the technician or user often forgets to enable the memory module slot after performing a repair action, the computer memory subsystem does not utilize the new memory module. Moreover, when the user discovers that the computer memory subsystem is not using the new memory module, the user typically has to again request the assistance of the computer technician, increasing overall maintenance costs and generating additional downtime for the computer system.

SUMMARY OF THE INVENTION

Methods, systems, and products are disclosed for enabling memory module slots in a computing system after a repair action, the computing system having a plurality of memory module slots and having at least one memory module installed in one of the memory module slots, that includes: determining, during a boot process for the computing system, whether any of the memory module slots are disabled; and if any of the memory module slots are disabled: retrieving, for each memory module installed in one of the memory module slots, a memory module identifier for that memory module, retrieving, from non-volatile memory of the computing system, previously stored memory module identifiers, determining whether the retrieved memory module identifiers match the previously stored memory module identifiers, and enabling the disabled memory module slots if the retrieved memory module identifiers do not match the previously stored memory module identifiers.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
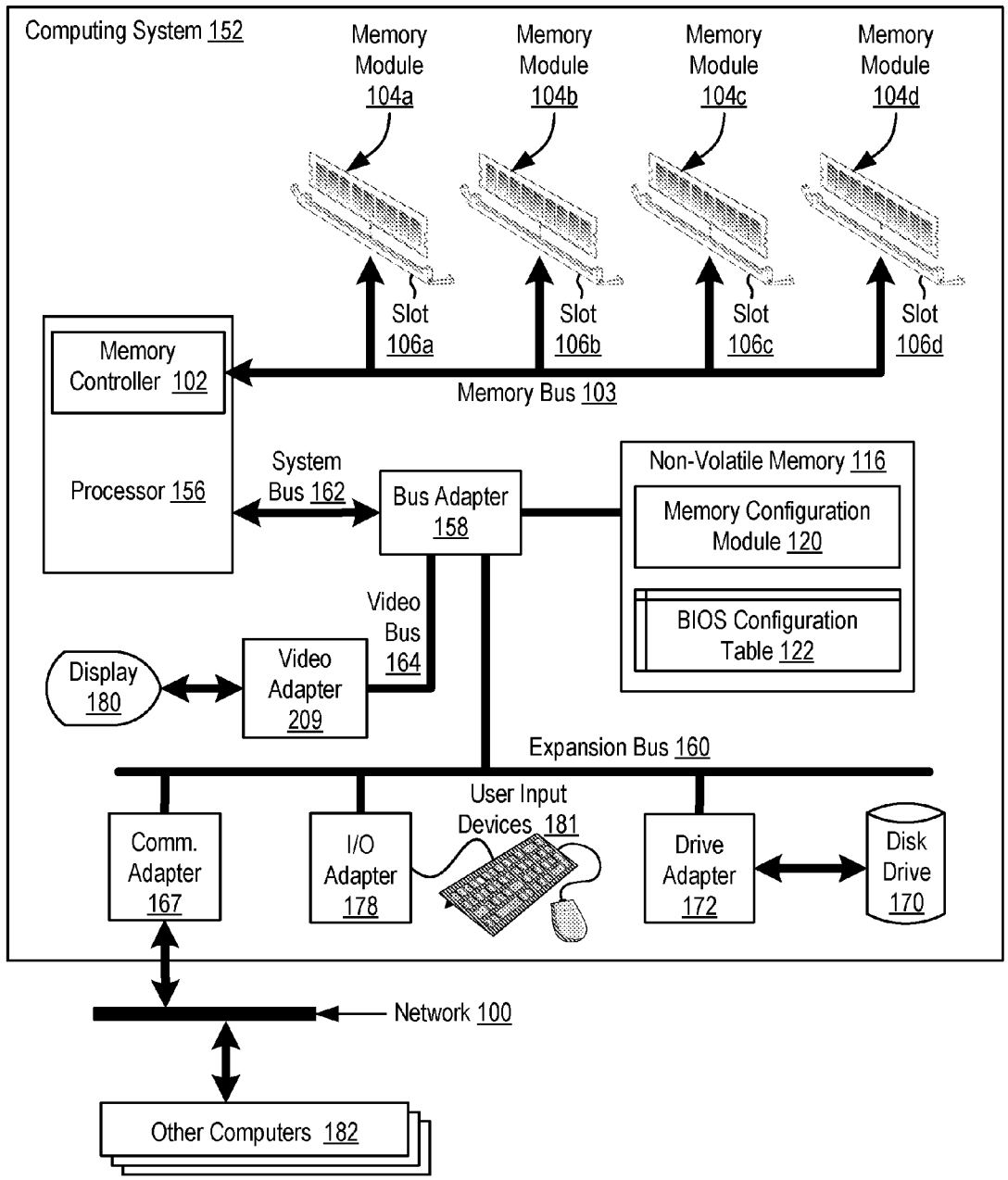
FIG. 1 sets forth a block diagram illustrating an exemplary computing system that includes an exemplary enabling memory module slots in a computing system after a repair action according to embodiments of the present invention.

Exemplary methods, systems, and products for enabling memory module slots in a computing system after a repair action according to embodiments of the present invention are described with reference to the accompanying drawings, beginning with FIG. 1. FIG. 1 sets forth a block diagram illustrating an exemplary computing system (152) for enabling memory module slots (106) in the computing system (152) after a repair action according to embodiments of the present invention. As mentioned above, a repair action generally refers to an action taken to replace a failed memory module. The repair action is typically performed by a user or a computer technician, but readers will recognize that any person or machine as will occur to those of skill in the art may perform a repair action.

The exemplary computing system (152) of FIG. 1 includes four memory module slots (106). The exemplary computing system (152) of FIG. 1 has four memory modules (104) installed in the four memory module slots (106). Specifically, the memory module (104a) is installed in the memory module slot (106a). The memory module (104b) is installed in the memory module slot (106b). The memory module (104c) is installed in the memory module slot (106c). The memory module (104d) is installed in the memory module slot (106d). These memory modules (104) and memory module slots (106) may be implemented according to the double data-rate ('DDR') family of specifications promulgated by JEDEC or any other specifications as will occur to those of skill in the art.

Each memory module (104) of FIG. 1 is a small printed circuit board or other substrate having mounted upon it a plurality of random access memory ('RAM') devices and the supporting circuitry and components for those RAM devices. The RAM devices included in each memory module (104) in the example of FIG. 1 are integrated circuit chips that store data for access in any order. Examples of RAM devices that may be useful for enabling memory module slots in a computing system after a repair action according to embodiments of the present invention may include static RAM ('SRAM'), dynamic RAM ('DRAM'), synchronous DRAM ('SDRAM'), double data rate synchronous DRAM ('DDR SDRAM'), and so on. In the example of FIG. 1, memory modules (104) may be implemented as DIMMs that include a number of DRAM memory devices.

The exemplary computing system (152) of FIG. 1 also includes a memory controller (102) connected to the memory modules (104) through a memory bus (103). The memory controller (102) of FIG. 1 is configured in a processor (156), or central processing unit ('CPU'), and transmits and receives electronic signals from memory modules (104) through the memory bus (103). Memory controller (102) is component for controlling access to the RAM devices installed on memory modules (104). The memory controller (102) of FIG. 1 generates the necessary signals to control the reading and writing of information from and to the RAM devices, and serves as an interface for the RAM devices with the processor (156). Although the memory controller (102) of FIG. 1 is integrated into the processor (156) in the example of FIG. 1, readers will note that such an implementation is for explanation only and not for limitation. In some other embodiments, the memory controller (102) may be implemented as a separate component integrated into the system chipset of a motherboard or in any other manner as will occur to those of ordinary skill in the art.

The exemplary computing system (152) of FIG. 1 also includes non-volatile computer memory (116) connected to the processor (156) through the bus adapter (158) and system bus (162). The non-volatile memory (116) may be implemented as Electrically Erasable Programmable Read-Only Memory ('EEPROM'). Although FIG. 1 illustrates the non-volatile computer memory (116) connected to the processor (156) through bus adapter (158) and system bus (162), readers will note that other configurations for connecting non-volatile memory (116) to processor (156) as will occur to those of skill in the art are also well within the scope of the present invention.

The non-volatile memory (116) of FIG. 1 includes a memory configuration module (122). The memory configuration module (122) of FIG. 1 is a set of computer program instructions for enabling memory module slots (106) in the computing system (152) after a repair action according to embodiments of the present invention. The memory configuration module (122) of FIG. 1 operates generally for enabling memory module slots (106) in the computing system (152) after a repair action according to embodiments of the present invention by determining, during a boot process for the computing system (152), whether any of the memory module slots (106) are disabled and if any of the memory module slots (106) are disabled: retrieving, for each memory module (104) installed in one of the memory module slots (106), a memory module identifier for that memory module; retrieving, from non-volatile memory (116) of the computing system (152), previously stored memory module identifiers; determining whether the retrieved memory module identifiers match the previously stored memory module identifiers; and enabling the disabled memory module slots (106) if the retrieved memory module identifiers do not match the previously stored memory module identifiers.

The term 'boot process' in this specification refers to a process of executing computer program instructions from the time that the computing device is initially powered on or restarted until an operating system loads. During the boot process, BIOS identifies and initializes hardware components such as, for example, hard drives, CDs, bus adapters, chipsets, and so on, so that other software programs stored on various media can load, execute, and assume control of the computing system (152).

As mentioned above, the memory configuration module (120) of FIG. 1 retrieves a memory module identifier for each memory module (104) installed in one of the memory module slots (106). A memory module identifier identifies a particular memory module installed in a memory module slot of the computing system. For example, the memory module identifier may be implemented as a serial number for the memory module. In some embodiments, the memory module identifier may identify a particular memory module with a particular memory module slot (106) in which the particular memory module is installed. For example, the memory module identifier may represent the combination of a serial number for a memory module and a slot identifier specifying the memory module slot in which that memory module is installed. The memory module identifier may represent the combination of a serial number and a slot identifier as a value outputted from an algorithm that accepts the serial number and the slot identifier as inputs. Such an algorithm may concatenate the serial number and the slot identifier, perform a mathematical operation using the binary representations of the serial number and the slot identifier, apply a hash algorithm to the serial number and the slot identifier, or any other operation as will occur to those of skill in the art.

In addition to retrieving the memory module identifiers for each of the memory module currently installed in the slots of the computing system, the memory configuration module (120) of FIG. 1 also retrieves previously stored memory module identifiers from non-volatile memory (116) of the computing system (152). A previously stored memory module identifier identifies a particular memory module that was previously installed in a memory module slot of the computing system. For example, the previously stored memory module identifier may be implemented as a serial number for a memory module that was installed in the computing system the previous time that the computing system was powered on. In some embodiments, the previously stored memory module identifier may identify a particular memory module with a particular memory module slot in which the particular memory module was previously installed. For example, the previously stored memory module identifier may represent the combination of the serial number for a previously installed memory module and a slot identifier for the memory module slot in which that previously installed memory module was installed. The previously stored memory module identifiers were 'previously stored' during a previous boot process for the computing system.

In embodiments in which the memory module identifiers and previously stored memory module identifiers are implemented as serial numbers, readers will note that if the set of memory module identifiers for the computing system (152) differ from the set of previously stored memory module identifiers in non-volatile memory, then the memory configuration module may determine that a memory module has been added or removed from the computing system. In embodiments in which the memory module identifiers and previously stored memory module identifiers are implemented as serial numbers in combination with slot identifiers, readers will note that if the set of memory module identifiers for the computing system (152) differ from the set of previously stored memory module identifiers in non-volatile memory, then the memory configuration module may determine that a memory module has been added, removed, or moved from one slot to another within the computing system (152).

In the exemplary computing system (152) of FIG. 1, the non-volatile memory (116) includes a BIOS configuration data table (122). The BIOS configuration data table (122) is a data structure that stores configuration information regarding system components such as, for example, the memory controller (102), the memory modules (104), the memory module slots (106), and the memory bus (103). Configuration information may include which memory module slots (106) are enabled and which slots are disabled, which memory modules (104) are installed in which slots (106), previously stored memory module identifiers, memory bus operating parameters, memory controller operating parameters, and so on.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers having enabling memory module slots in a computing system after a repair action according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the system bus (162), which is also a high speed bus.

The exemplary computing system (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful in computers having enabling memory module slots in a computing system after a repair action according to embodiments of the present invention include modems for wired dial-up communications, Ethernet (IEEE 802.3) adapters for wired data communications network communications, and 802.11 adapters for wireless data communications network communications.

The arrangement components making up the exemplary computer (152) illustrated in FIG. 1 are for explanation, not for limitation. Computers useful according to various embodiments of the present invention may include additional components, data communications buses, or other computer architectures, not shown in FIG. 1, as will occur to those of skill in the art. In such a manner, various embodiments of the present invention may be implemented on a variety of hardware platforms in addition to those illustrated in FIG. 1.

Figure 2:
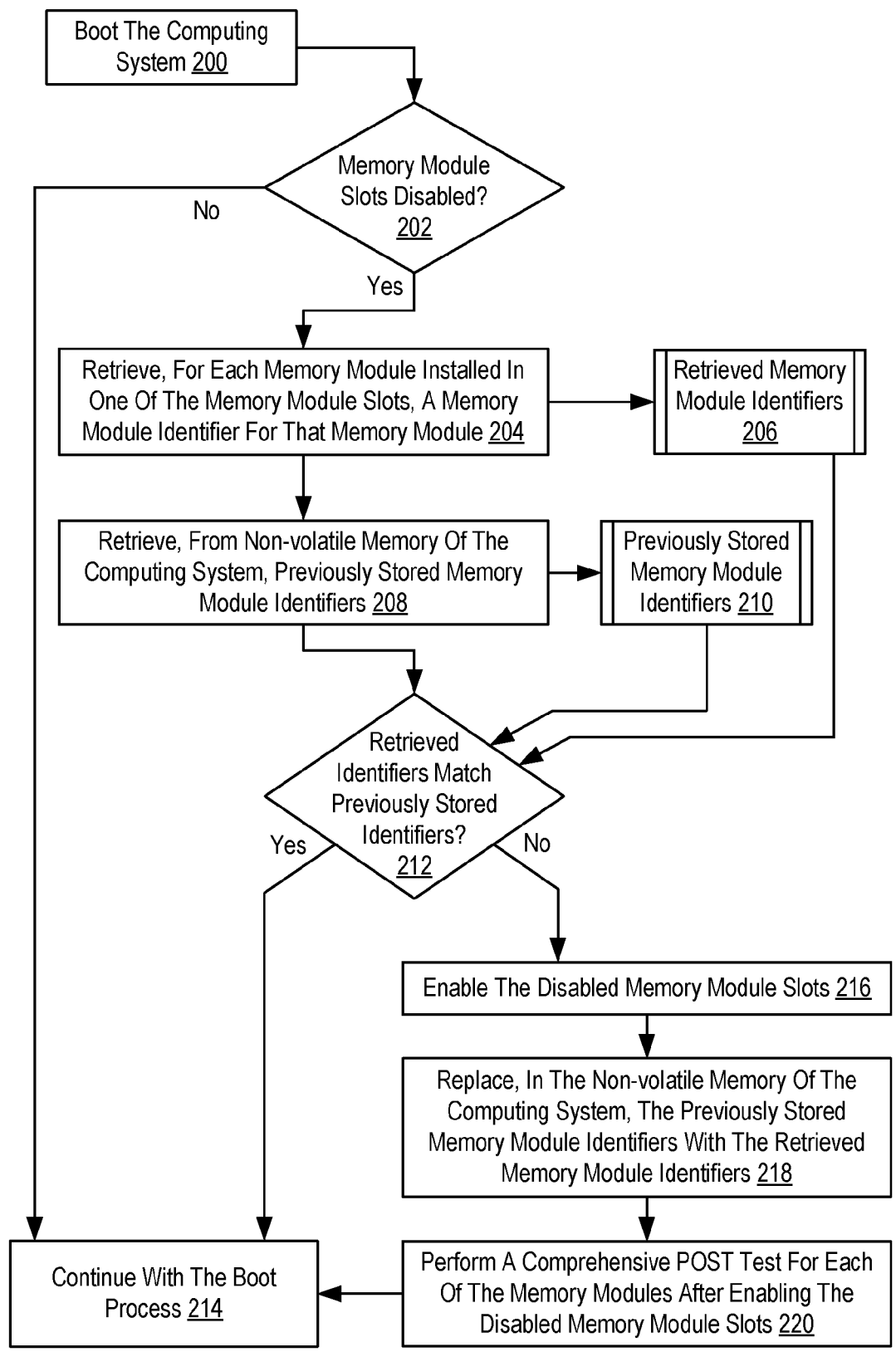
FIG. 2 sets forth a flow chart illustrating an exemplary method of enabling memory module slots in a computing system after a repair action according to embodiments of the present invention.

FIG. 2 sets forth a flow chart illustrating an exemplary method of enabling memory module slots in a computing system after a repair action according to embodiments of the present invention. The computing system described with reference to FIG. 2 has a plurality of memory module slots and has at least one memory module installed in one of the memory module slots.

The method of FIG. 2 includes booting (200) the computing system. Booting (200) the computing system according to the method of FIG. 2 may be carried out by turning on the power to the computer, performing a hard reboot, or performing a soft reboot. A hard reboot is when power to the computing system is cycled off and then on or a special reset signal for the processor is triggered. Typically, during a hard reboot, the computing system is restarted without first performing any shut-down procedure. A soft reboot is when the computing system is restarted under software control, without removing power or directly triggering the special reset signal for the processor. Typically, a soft reboot refers to an orderly shutdown and restarting of the computing system.

The method of FIG. 2 also includes determining (202), by a memory configuration module during a boot process for the computing system, whether any of the memory module slots are disabled. As mentioned above, a BIOS configuration data table stored in non-volatile memory may be used to maintain the status for each memory module slot in the computing system such as whether each slot is enabled or disabled. The memory configuration module may determine (202) whether any of the memory module slots are disabled according to the method of FIG. 2 by identifying whether a BIOS configuration data table in non-volatile memory indicates that any of the slots in the computing system are disabled. The BIOS configuration data table may indicate that a memory module slot is disabled by associating a disable value with a slot identifier for that particular slot.

The method of FIG. 2 includes continuing (214) with the boot process if none of the memory module slots are disabled. Continuing (214) with the boot process according to the method of FIG. 2 may be carried out by resuming the boot process at the computer program instructions immediately following the computer program instructions used to invoke execution of the memory configuration module for enabling memory module slots in a computing system after a repair action according to embodiments of the present invention.

If any of the memory module slots are disabled, however, the method of FIG. 2 includes retrieving (204), by the memory configuration module for each memory module installed in one of the memory module slots, a memory module identifier (206) for that memory module. The memory configuration module may retrieve (204) a memory module identifier (206) for each memory module installed in one of the memory module slots according to the method of FIG. 2 by retrieving a serial number and a slot identifier for that memory module and generating the memory module identifier (206) for that memory module using a hashing algorithm on the serial number and the slot identifier for that memory module. The memory configuration module may retrieve a serial number for that memory module from a serial presence detect ('SPD') EEPROM installed on that memory module. SPD is described in JEDEC Standard No. 21-C and refers to a standardized way of accessing information about a computer memory module from an EEPROM mounted on the memory module. The memory configuration module may retrieve a slot identifier for that memory module from a BIOS configuration data table in non-volatile memory, which associates each physical memory module slot with a slot identifier. Readers will note that the use of SPD EEPROM is for explanation only and not for limitation. In other embodiments, Vital Product Data ('VPD') may be utilized according to embodiments of the present invention.

Generating the memory module identifier for each memory module using a hashing algorithm on the serial number and the slot identifier may be carried out by concatenating the serial number and the slot identifier together and providing that concatenated serial number and slot identifier as input for the hashing algorithm. Implementing the memory module identifier as a hash value rather than merely the concatenation of the serial number and the slot identifier typically reduces the amount of storage space needed to store the memory module identifier in non-volatile memory.

The method of FIG. 2 also includes retrieving (208), by the memory configuration module from non-volatile memory of the computing system, previously stored memory module identifiers (210). The previously stored memory module identifiers (210) represent the serial numbers for previously installed memory modules and slot identifiers specifying the memory module slots in which those previously installed memory modules were installed. The memory configuration module may retrieve (208) previously stored memory module identifiers (210) according to the method of FIG. 2 from a BIOS configuration data table maintained in non-volatile memory.

The method of FIG. 2 also includes determining (212), by the memory configuration module, whether the retrieved memory module identifiers (206) match the previously stored memory module identifiers (210). The memory configuration module may determine (212) whether the retrieved memory module identifiers (206) match the previously stored memory module identifiers (210) according to the method of FIG. 2 by identifying whether the set of retrieved memory module identifiers (206) is the same as the set of previously stored memory module identifiers (210). The memory configuration module may identify whether the set of retrieved memory module identifiers (206) is the same as the set of previously stored memory module identifiers (210) by identifying whether any of the retrieved memory module identifiers (206) are not included in the set of previously stored memory module identifiers (210) or whether any of the previously stored memory module identifiers (210) are not included in the set of retrieved memory module identifiers (206). If the set of retrieved memory module identifiers (206) is the same as the set of previously stored memory module identifiers (210), then the retrieved memory module identifiers (206) match the previously stored memory module identifiers (210), thereby indicating that no memory modules have been removed, added, or moved in the computing system. If the set of retrieved memory module identifiers (206) is not the same as the set of previously stored memory module identifiers (210), then the retrieved memory module identifiers (206) do not match the previously stored memory module identifiers (210), thereby indicating that at least one memory module has been removed, added, or moved in the computing system.

The method of FIG. 2 includes continuing (214) with the boot process if the retrieved memory module identifiers (206) match the previously stored memory module identifiers (210). As mentioned above, continuing (214) with the boot process according to the method of FIG. 2 may be carried out by resuming the boot process at the computer program instructions immediately following the computer program instructions used to invoke execution of the memory configuration module for enabling memory module slots in a computing system after a repair action according to embodiments of the present invention.

The method of FIG. 2 also includes enabling (216), by the memory configuration module, the disabled memory module slots if the retrieved memory module identifiers (206) do not match the previously stored memory module identifiers (210). The memory configuration module may enable (216) the disabled memory module slots according to the method of FIG. 2 by writing enablement information to the BIOS configuration data table, thereby mapping the disabled memory slots into the memory space of the processor for the computing system.

The method of FIG. 2 includes replacing (218), by the memory configuration module in the non-volatile memory of the computing system, the previously stored memory module identifiers (210) with the retrieved memory module identifiers (206) if the retrieved memory module identifiers (206) do not match the previously stored memory module identifiers (210). The memory configuration module may replace (218) the previously stored memory module identifiers (210) in the non-volatile memory of the computing system with the retrieved memory module identifiers (206) according to the method of FIG. 2 by storing the retrieved memory module identifiers (206) in the BIOS configuration data table in non-volatile memory. In such a manner, the next time that the computing system boots, the memory configuration module will be able to determine whether any memory modules have been added, removed, or moved in the computing system.

The method of FIG. 2 also includes performing (220) a comprehensive Power On Self Test ('POST') routine for each of the memory modules after enabling the disabled memory module slots. A regular POST routine is a test performed during the boot process that locates the memory modules installed in the memory module slots, identifies the size of the memory modules, and performs error-checking to verify the integrity of each memory module. A comprehensive POST routine performs more intensive error-checking than a regular POST routine, and as such a comprehensive POST routine is more time-consuming. Because a comprehensive POST routine is more time-consuming a regular POST routine, regular POST routine is typically performed each time power is cycled off and on, while a comprehensive POST routine is generally performed only when the memory modules are added, removed, or moved in the computing system. Performing (220) a comprehensive POST routine for each of the memory modules after enabling the disabled memory module slots according to the method of FIG. 2 may be carried out by invoking a comprehensive POST routine and passing processor control the invoked comprehensive POST routine.

As mentioned above, a memory configuration module may retrieve a memory module identifier for a memory module installed in one of the memory module slots by retrieving a serial number for that memory module from a serial presence detect ('SPD') EEPROM installed on that memory module. Readers will note, however, that not all memory modules may have a serial number that can be used to generate a memory module identifier as discussed above. In such cases, a memory configuration module may generate the memory module identifier for the memory module. For further explanation, therefore, FIG. 3 sets forth a flow chart illustrating a further exemplary method of enabling memory module slots in a computing system after a repair action according to embodiments of the present invention. The computing system described with reference to FIG. 3 has a plurality of memory module slots and has at least one memory module installed in one of the memory module slots.

Figure 3:
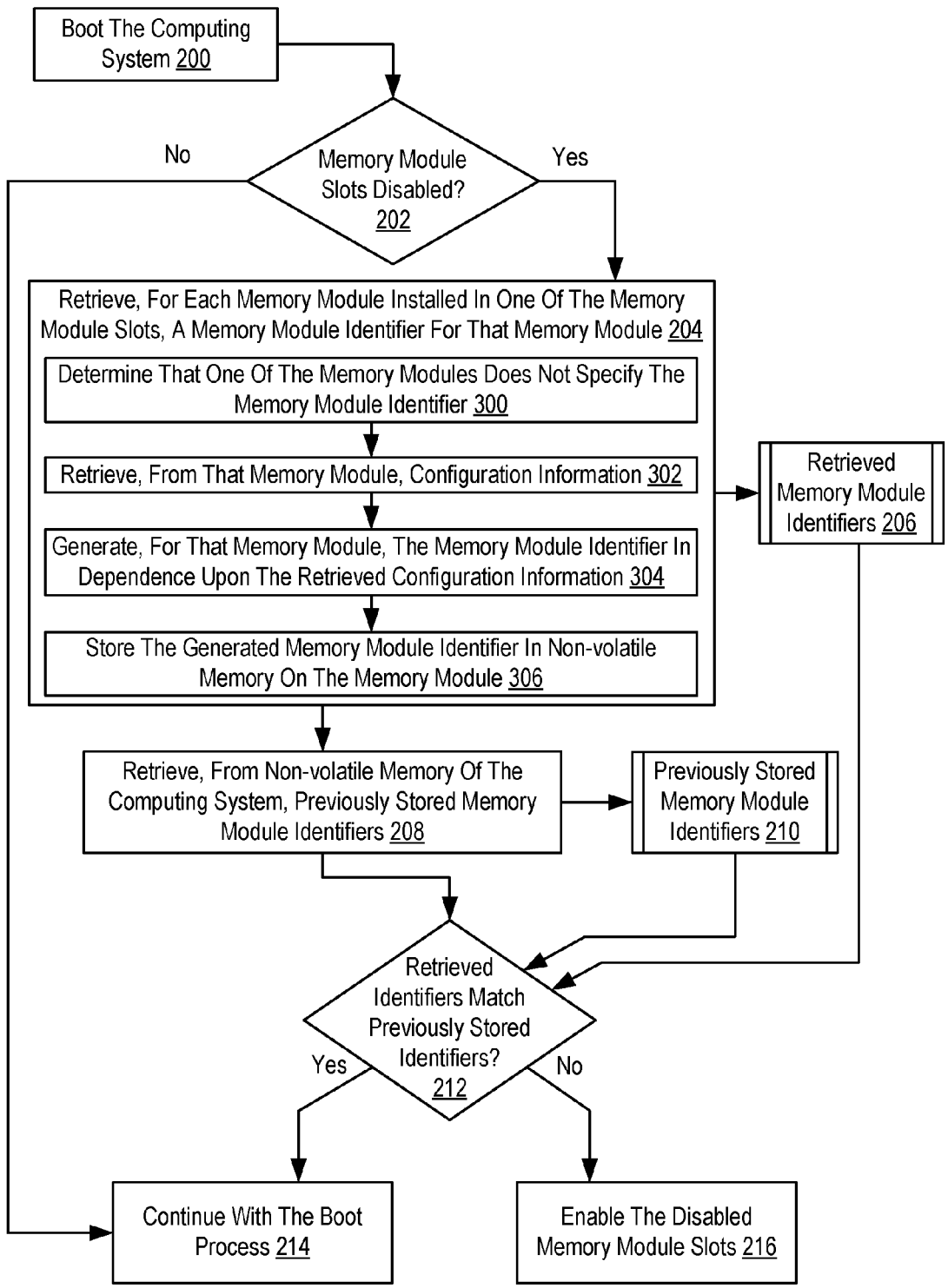
FIG. 3 sets forth a flow chart illustrating a further exemplary method of enabling memory module slots in a computing system after a repair action according to embodiments of the present invention.

The method of FIG. 3 is similar to the method of FIG. 2. That is, the method of FIG. 3 includes booting (200) the computing system and determining (202), by a memory configuration module during a boot process for the computing system, whether any of the memory module slots are disabled. The method of FIG. 3 also includes, if any of the memory module slots are disabled: retrieving (204), by the memory configuration module for each memory module installed in one of the memory module slots, a memory module identifier (206) for that memory module; retrieving (208), by the memory configuration module from non-volatile memory of the computing system, previously stored memory module identifiers (210); determining (212), by the memory configuration module, whether the retrieved memory module identifiers (206) match the previously stored memory module identifiers (210); and enabling (216), by the memory configuration module, the disabled memory module slots if the retrieved memory module identifiers (206) do not match the previously stored memory module identifiers (210). The method of FIG. 3 also includes continuing (214) with the boot process if none of memory module slots are disabled or if the retrieved memory module identifiers (206) match the previously stored memory module identifiers (210).

The method of FIG. 3, however, differs from the method of FIG. 2 in the manner in which the memory configuration module retrieves (204) a memory module identifier for each memory module installed in one of the memory module slots. Retrieving (204) a memory module identifier for each memory module installed in one of the memory module slots according to the method of FIG. 3 includes determining (300) that one of the memory modules does not specify the memory module identifier. The memory configuration module may determine (300) that one of the memory modules does not specify the memory module identifier according to the method of FIG. 3 by retrieving a value for the serial number field in each memory module's SPD EEPROM. If any of the values does not specify a serial number, then one of the memory modules does not specify the memory module identifier. A value may not specify a serial number if that value is NULL or if all the bits of that value are '0' or '1.'

Retrieving (204) a memory module identifier for each memory module installed in one of the memory module slots according to the method of FIG. 3 also includes generating (304) the memory module identifier for that memory module that does not specify a memory module. The memory configuration module may generate (304) the memory module identifier according to the method of FIG. 3 as a function of the computing system's Universally Unique Identifier ('UUID'), the current time, and the slot identifier for the slot in which the memory module is installed. Readers will note that generating a memory module identifier in such a manner is for explanation only and not for limitation. In fact, any manner of generating a memory module identifier as will occur to those of skill in the art may be useful in embodiments of the present invention.

Retrieving (204) a memory module identifier for each memory module installed in one of the memory module slots according to the method of FIG. 3 also includes storing (306) the generated memory module identifier in non-volatile memory on the memory module that did not specify a memory module identifier. The memory configuration module may store (306) the generated memory module identifier in non-volatile memory on the memory module according to the method of FIG. 3 by storing the generated memory module identifier in a field on the memory module's SPD EEPROM. In such a manner, the memory module will have a memory module identifier capable of being retrieved by the memory configuration module according to embodiments of the present invention.

Exemplary embodiments of the present invention are described largely in the context of a fully functional computer system for enabling memory module slots in a computing system after a repair action. Readers of skill in the art will recognize, however, that the present invention also may be embodied in a computer program product disposed on computer media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of enabling memory module slots in a computing system after a repair action, the computing system having a plurality of memory module slots and having at least one memory module installed in one of the memory module slots, the method comprising:
   determining, by a memory configuration module during a boot process for the computing system, whether any of the memory module slots are disabled; and
   if any of the memory module slots are disabled:

retrieving, by the memory configuration module for each memory module installed in one of the memory module slots, a memory module identifier for that memory module, retrieving, by the memory configuration module from non-volatile memory of the computing system, previously stored memory module identifiers, determining, by the memory configuration module, whether the retrieved memory module identifiers match the previously stored memory module identifiers, and enabling, by the memory configuration module, the disabled memory module slots if the retrieved memory module identifiers do not match the previously stored memory module identifiers.

2. The method of claim 1 further comprising replacing, by the memory configuration module in the non-volatile memory of the computing system, the previously stored memory module identifiers with the retrieved memory module identifiers if the retrieved memory module identifiers do not match the previously stored memory module identifiers.

3. The method of claim 1 wherein retrieving, by the memory configuration module for each memory module installed in one of the memory module slots, a memory module identifier for that memory module further comprises:

determining that one of the memory modules does not specify the memory module identifier;

generating, for that memory module, the memory module identifier; and storing the generated memory module identifier in non-volatile memory on the memory module.

4. The method of claim 1 wherein:

the memory module identifier for each memory module represents a serial number for that memory module and a slot identifier, the slot identifier specifying the memory module slot in which that memory module is installed; and the previously stored memory module identifiers represent the serial numbers for previously installed memory modules and slot identifiers specifying the memory module slots in which those previously installed memory modules were installed.

5. The method of claim 1 wherein retrieving, by the memory configuration module for each memory module installed in one of the memory module slots, a memory module identifier for that memory module further comprises:

retrieving a serial number and a slot identifier for that memory module; and generating the memory module identifier for that memory module using a hashing algorithm on the serial number and the slot identifier for that memory module.

6. The method of claim 1 further comprises performing a comprehensive Power On Self Test ('POST') routine for each of the memory modules after enabling the disabled memory module slots.

7. A computing system for enabling memory module slots in the computing system after a repair action, the computing system having a plurality of memory module slots and having at least one memory module installed in one of the memory module slots, the computing system comprising a computer processor operatively coupled to computer memory, the computer memory having disposed within it a memory configuration module, the memory configuration module further comprising computer program instructions capable of:

determining, by the memory configuration module during a boot process for the computing system, whether any of the memory module slots are disabled; and if any of the memory module slots are disabled:

retrieving, by the memory configuration module for each memory module installed in one of the memory module slots, a memory module identifier for that memory module, retrieving, by the memory configuration module from non-volatile memory of the computing system, previously stored memory module identifiers, determining, by the memory configuration module, whether the retrieved memory module identifiers match the previously stored memory module identifiers, and enabling, by the memory configuration module, the disabled memory module slots if the retrieved memory module identifiers do not match the previously stored memory module identifiers.

8. The computing system of claim 7 wherein the memory configuration module further comprises computer program instructions capable of replacing, by the memory configuration module in the non-volatile memory of the computing system, the previously stored memory module identifiers with the retrieved memory module identifiers if the retrieved memory module identifiers do not match the previously stored memory module identifiers.

9. The computing system of claim 7 wherein retrieving, by the memory configuration module for each memory module installed in one of the memory module slots, a memory module identifier for that memory module further comprises:

determining that one of the memory modules does not specify the memory module identifier;

generating, for that memory module, the memory module identifier; and storing the generated memory module identifier in non-volatile memory on the memory module.

10. The computing system of claim 7 wherein:

the memory module identifier for each memory module represents a serial number for that memory module and a slot identifier, the slot identifier specifying the memory module slot in which that memory module is installed; and the previously stored memory module identifiers represent the serial numbers for previously installed memory modules and slot identifiers specifying the memory module slots in which those previously installed memory modules were installed.

11. The computing system of claim 7 wherein retrieving, by the memory configuration module for each memory module installed in one of the memory module slots, a memory module identifier for that memory module further comprises:

retrieving a serial number and a slot identifier for that memory module; and generating the memory module identifier for that memory module using a hashing algorithm on the serial number and the slot identifier for that memory module.

12. The computing system of claim 7 wherein the computer memory has disposed within it computer program instructions capable of performing a comprehensive Power On Self Test ('POST') routine for each of the memory modules after enabling the disabled memory module slots.

13. A computer program product for enabling memory module slots in a computing system after a repair action, the computing system having a plurality of memory module slots and having at least one memory module installed in one of the memory module slots, the computer program product stored in a computer readable medium, the computer program product comprising computer program instructions capable of:

determining, by a memory configuration module during a boot process for the computing system, whether any of the memory module slots are disabled; and if any of the memory module slots are disabled:
- retrieving, by the memory configuration module for each memory module installed in one of the memory module slots, a memory module identifier for that memory module,
- retrieving, by the memory configuration module from non-volatile memory of the computing system, previously stored memory module identifiers,
- determining, by the memory configuration module, whether the retrieved memory module identifiers match the previously stored memory module identifiers, and
- enabling, by the memory configuration module, the disabled memory module slots if the retrieved memory module identifiers do not match the previously stored memory module identifiers.

14. The computer program product of claim 13 further comprising computer program instructions capable of replacing, by the memory configuration module in the non-volatile memory of the computing system, the previously stored memory module identifiers with the retrieved memory module identifiers if the retrieved memory module identifiers do not match the previously stored memory module identifiers.

15. The computer program product of claim 13 wherein retrieving, by the memory configuration module for each memory module installed in one of the memory module slots, a memory module identifier for that memory module further comprises:
- determining that one of the memory modules does not specify the memory module identifier;
- generating, for that memory module, the memory module identifier; and
- storing the generated memory module identifier in non-volatile memory on the memory module.

16. The computer program product of claim 13 wherein:
- the memory module identifier for each memory module represents a serial number for that memory module and a slot identifier, the slot identifier specifying the memory module slot in which that memory module is installed; and
- the previously stored memory module identifiers represent the serial numbers for previously installed memory modules and slot identifiers specifying the memory module slots in which those previously installed memory modules were installed.

17. The computer program product of claim 13 wherein retrieving, by the memory configuration module for each memory module installed in one of the memory module slots, a memory module identifier for that memory module further comprises:
- retrieving a serial number and a slot identifier for that memory module; and
- generating the memory module identifier for that memory module using a hashing algorithm on the serial number and the slot identifier for that memory module.

18. The computer program product of claim 13 further comprises computer program instructions capable of performing a comprehensive Power On Self Test ('POST') routine for each of the memory modules after enabling the disabled memory module slots.

19. The computer program product of claim 13 wherein the computer readable medium comprises a recordable medium.

* * * * *